United States Patent [19]

d'Hautecourt et al.

[11] 4,338,624
[45] Jul. 6, 1982

[54] ON SCREEN COLOR DISPLAY

[75] Inventors: Alain H. d'Hautecourt, Prospect Heights; George J. Tzakis, Glenview, both of Ill.

[73] Assignee: Zenith Radio Corporation, Glenview, Ill.

[21] Appl. No.: 222,476

[22] Filed: Jan. 5, 1981

[51] Int. Cl.³ ............................................. H04N 9/535
[52] U.S. Cl. ........................................ 358/22; 358/81
[58] Field of Search ...................... 358/22, 81, 82, 183

[56] References Cited

U.S. PATENT DOCUMENTS

| 3,812,285 | 5/1974 | Miyata et al. | 358/192.1 |
| 4,081,797 | 3/1978 | Olson | 358/192.1 |
| 4,135,182 | 1/1979 | Bell et al. | 358/141 |
| 4,218,698 | 8/1980 | Bart et al. | 358/22 |
| 4,229,760 | 10/1981 | Avery | 358/22 |

Primary Examiner—Richard Murray
Attorney, Agent, or Firm—Jack Kail

[57] ABSTRACT

A television receiver includes an interface circuit enabling the production of on-screen displays of alpha-numeric type information in a selected color. The interface circuit is responsive to a blanking signal for reducing the red, green and blue video signals developed in response to a received NTSC color television signal below the blanking level of the television receiver. A digital signal representing selected alpha-numeric type information is coupled from a character generator to the interface circuit for increasing the potential at one or more of the electron guns of the receiver for producing a corresponding on-screen display in a selected color.

12 Claims, 3 Drawing Figures

ON SCREEN COLOR DISPLAY

BACKGROUND OF THE INVENTION

The present invention relates generally to color television receivers and, more particularly, to a color television receiver including an interface system adapted for selectively enabling the receiver for operation in a first mode wherein a color video image is conventionally reproduced in accordance with a received television signal or, alternatively, in a second mode wherein an alpha-numeric type display is produced on all or part of the screen in a selected color.

The use of color television receivers for providing on-screen displays of alpha-numeric type information, the term alpha-numeric type information as used herein being intended to comprehend both alpha-numeric characters as well as graphics, is generally known in the art, one relatively common example thereof being the on-screen display of channel number and time information. U.S. Pat. No. 4,081,797 to Olson discloses a system of this type wherein time and channel number information developed by a character generator is suitably multiplexed for developing a video signal which is used to drive the cathode ray tube (CRT) of a color television receiver. Another circuit designed for performing a similar function is disclosed in U.S. Pat. No. 3,812,285 to Miyata et al.

In addition to the on-screen display of time and channel number information, great interest has recently been expressed in other forms of on-screen alpha-numeric type displays including captioning for the deaf, teletext and viewdata information. In captioning for the deaf, as in the case of channel number and time displays, the alpha-numeric display is superimposed over a portion of the video image reproduced on the CRT screen in response to a received television signal whereas, in the case of teletext and viewdata information, the entire CRT screen is typically used to reproduce the alpha-numeric characters. In the past, the alpha-numeric information intended for display on the CRT screen has generally been inserted in the luminance signal path of the receiver so that only corresponding white images could be reproduced. As disclosed in U.S. Pat. No. 4,135,182 to Bell et al, it is also known to convert an alpha-numeric signal to a monochrome NTSC television signal which may then be coupled directly to the antenna terminals of a television receiver for reproducing the alpha-numerics in terms of a black and white image. U.S. Pat. No. 4,218,698 to Bart et al discloses a system wherein alpha-numeric type information signals are coupled to the R, G, B inputs of the video output stage of a color television receiver in place of the corresponding video signals developed in response to a received television signal, but this system uses a plurality transmission gates which are relatively expensive and therefore does not provide a circuit desirable for use in a mass produced consumer product.

It is therefore a basic object of the present invention to provide a novel circuit for facilitating the display of alpha-numeric type information on the screen of a color television receiver. It is a more specific object of the invention to provide a relatively inexpensive circuit capable of providing complete or partial on-screen displays, in a selected color, of alpha-numeric type information derived from various different sources including, but not limited to, channel number and time generators and teletext and viewdata decoders.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings, in which like reference numberals identify like elements in the several Figures and in which:

DESCRIPTION OF THE PREFERRED EMBODIMENT

Figure 1:
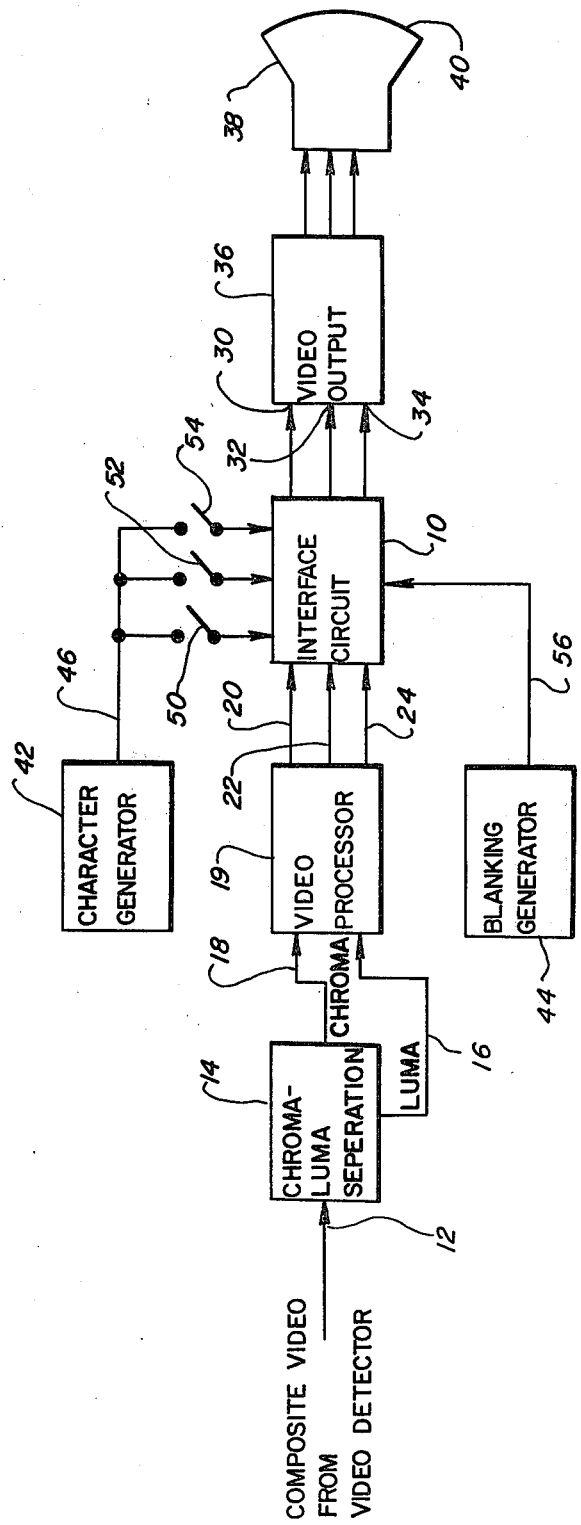
FIG. 1 is a general block diagram illustrating the use of the circuit of the invention in a color television receiver for playing alpha-numeric type information such as channel number and time.

Referring now to the drawings, and, in particular to FIG. 1, there is shown in block form, a portion of a conventional color television receiver which includes an interface circuit 10 constructed according to the present invention. The color television receiver includes an input conductor 12 developing a composite video signal such as would be developed at the output of a conventional video detector in response to a received NTSC color television signal. The composite video signal developed on conductor 12 is applied to a conventional chrom-luma separation circuit 14 which separates the composite video signal into a luminance signal on an output conductor 16 and a chrominance signal on an output conductor 18. The luminance and chrominance signals are then coupled to a video processor 19 which processes the luminance and chrominance signals in a well known manner for deriving a red video signal on an output conductor 20, a green video signal on an output conductor 22 and a blue video signal on an output conductor 24. Normally, i.e. in conventional color television receivers not equipped with interface circuit 10, the red, green and blue video signals developed on conductors 20, 22 and 24 are directly coupled to the red, green and blue inputs 30, 32 and 34 respectively of a video output circuit 36 for amplification and therefrom to the respective electron guns of a CRT 38 whose screen 40 is activated for producing a color video image corresponding to the composite video signal developed on conductor 12.

The drawing of FIG. 1 also includes a character generator 42 and a blanking generator 44. Character generator 42 is of the type adapted for generating a digital signal comprising a sequence of voltage pulses on a single output conductor 46, this serial digital signal representing certain alpha-numeric information coupled to interface circuit 10 through a series of switches 50, 52 and 54 for display on the screen 40 of CRT 38. For example, character generator 42 may comprise a circuit responsive to the tuning section of the television receiver for developing a digital signal on output conductor 46 representing channel number and time information, various types of such circuits being well known in the the art. Usually, in displaying such alpha-numeric type information on the screen 40 of CRT 38, it is desired to blank at least a portion of the video image being produced in response to the composite video signal on conductor 12 to provide a darkened background for display of the alpha-numerics. This function is controlled by blanking generator 44 which couples a suitable blanking signal on an output conductor 56 to an input of interface circuit 10 in time coincidence with the development of the digital alpha-numeric signal on conductor 46. As an example, when channel number and time information is to be displayed on screen 40, blanking generator 44, in response to the horizontal and vertical synchronizing signals developed in the receiver, produces a blanking signal on output conductor 56 defining a relatively small area on screen 40 for which the video signals from video processor 19 will be blanked thereby forming a small darkened area in which the channel number and time alpha-numerics corresponding to the digital signal on conductor 46 will be displayed. Of course, the extent on screen 40 of CRT 38 to which the video signals are blanked will vary depending upon the application and, in certain cases, the video signals may be blanked over the entire screen.

Figure 2:
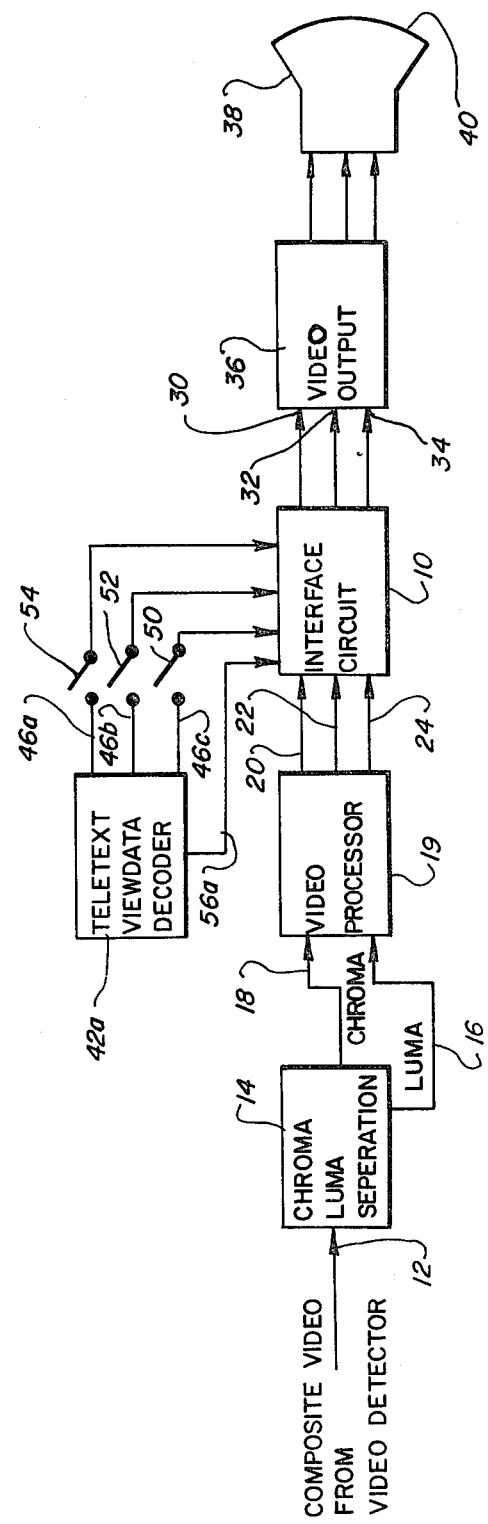
FIG. 2 is a general block diagram similar to that of FIG. 1 but showing the use of the circuit of the invention in a color television receiver for displaying alpha-numeric type information such as would be developed by a teletext or viewdata decoder.

FIG. 2 is largely similar to FIG. 1 except that interface circuit 10 is operated in response to a character generator 42a of the type developing alpha-numeric defining digital signals on three separate output conductors 46a, 46b and 46c, the signal developed on each respective output conductor being intended for application to a different one of the electron guns of CRT 38. Thus, character generator 42a may comprise a conventional teletext or viewdata type decoder or the like. Such decoders typically include an internal blanking generator for developing an output blanking signal adapted for blanking the video signals from video processor 19 over the entire CRT screen 40, this blanking signal being coupled to interface circuit 10 over a conductor 56a. In FIGS. 1 and 2, switches 50, 52 and 54 have been included to facilitate an explanation of the operation of the present invention but, as will be apparent from the following discussion, any or all of these switches may be replaced by hard-wired conductors or may be left as permanent open circuits.

Figure 3:
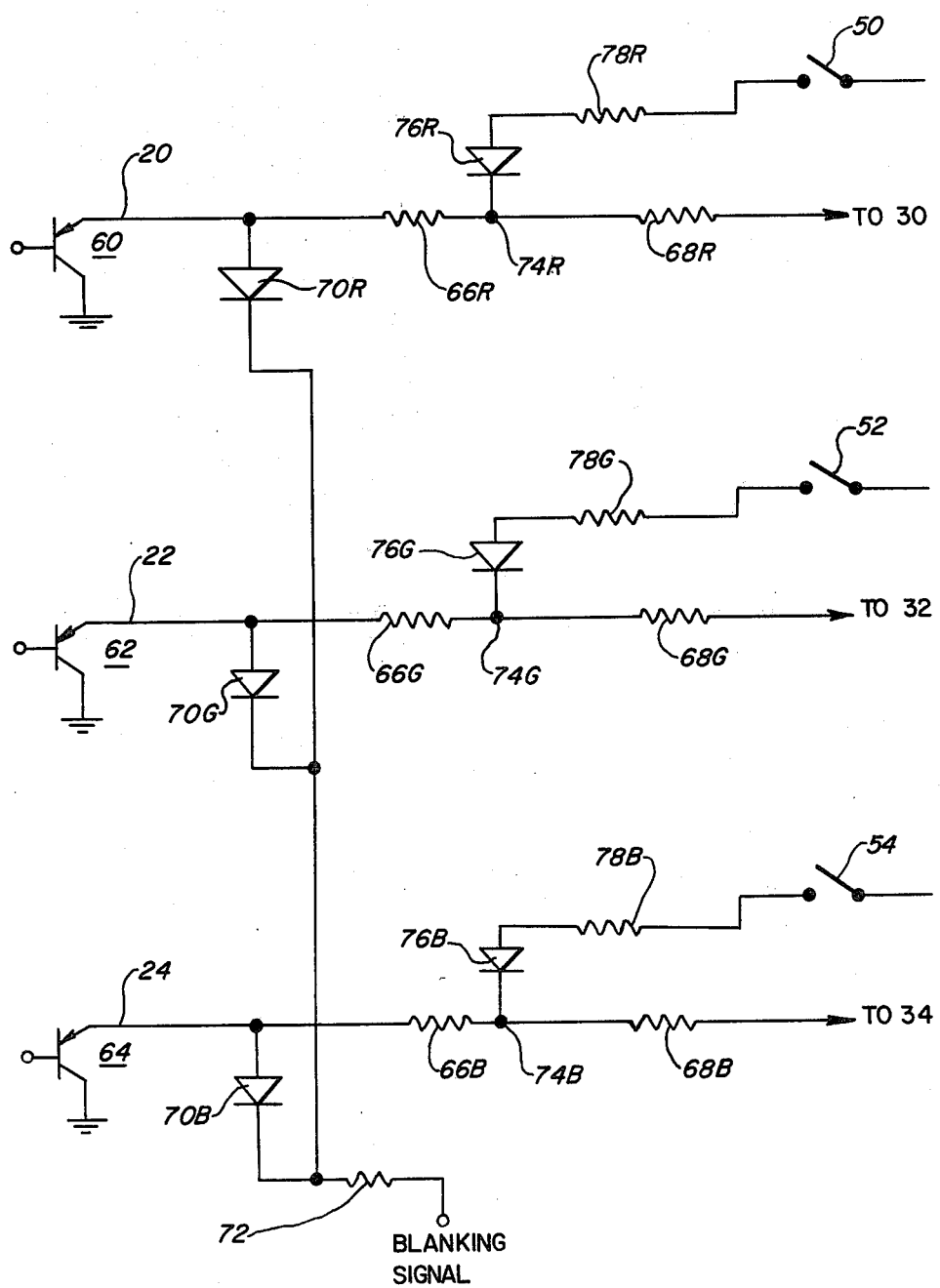
FIG. 3 is an electrical schematic diagram illustrating the interface circuit of the invention in detail.

With the foregoing background in mind, interface circuit 10 is shown in detailed schematic form in FIG. 3. As will be seen, this circuit is operable for driving CRT 38 for displaying a complete color video image in accordance with the composite video signal developed on conductor 12 or, alternatively, for displaying, in a selected color, alpha-numeric type information in accordance with the output of character generator 42 or 42a on all or a part of CRT screen 40 from which the red, green and blue video signals from video processor 19 have been blanked.

Referring now in detail to FIG. 3, the output of video processor 19 comprises three emitter-follower connected pnp transistors 60, 62 and 64 each developing a respective one of the red, green and blue video signals at its emitter terminal. The red video signal developed at the emitter of transistor 60 is coupled by conductor 20 to a pair of series connected resistors 66R and 68R and therefrom to input 30 of video output circuit 36, the circuit node 74R formed between resistors 66R and 68R being isolated from conductor 20 by resistor 66R. The emitter of transistor 60 is also connected by conductor 20 to the anode of a shunting diode 70R, the cathode of diode 70R being connected by a blanking resistor 72 to conductor 56 or 56a which develops the blanking signal produced by blanking generator 44 or character generator 42a. The circuit node 74R formed between resistors 66R and 68R is connected to the cathode of an isolating diode 76R whose anode is coupled by a resistor 78R to switch 50, switch 50 providing a sequence of alpha-numeric defining voltage pulses from either conductor 46 of character generator 42 or from conductor 46c of character generator 42a.

The outputs of emitter-follower transistors 62 and 64 of video processor 19 are connected to similarly configured components of interface circuit 10. Thus, the emitters of transistors 62 and 64 are connected by conductors 22 and 24 respectively to inputs 32 and 34 of video output circuit 36 through series connected resistor pairs 66G, 68G, and 68B and by a pair of diodes 70G and 70B respectively to blanking resistor 72. The common circuit nodes 74G and 74B formed between series connected resistor pairs 66G, 68G, 66B and 68B respectively are coupled to the cathodes of diodes 76G and 76B, the anodes of diodes 76G and 78B being connected through a pair of resistors 78G and 78B respectively to switches 52 and 54. Switch 52 couples alpha-numeric defining voltage pulses from either conductor 46 of character generator 42 or from conductor 46B of character generator 42a to circuit node 74G while switch 54 couples alpha-numeric defining voltage pulses from either conductor 46 or character generator 42 or from conductor 46a of character generator 42a to circuit node 74B.

Each color signal processing channel of interface circuit 10 operates in a substantially identical manner. Consider, initially, the operation of interface circuit 10 for enabling conventional operation of the television receiver wherein no digital alpha-numeric defining signals are coupled to switches 50, 52 and 54, it being desired to fully reproduce on CRT screen 40 the color video image defined by the composite video signal developed on conductor 12. In this case, the blanking signal coupled to conductor 56 or 56a by blanking generator 44 or character generator 42a is maintained at a positive potential of about 12 volts reverse biasing diode 70R as well as diodes 70G and 70B. As a consequence, no current is drawn through diodes 70R, 70G and 70B such that a sufficiently positive voltage, typically about 4.5 volts, is developed at the emitters of transistors 60, 61 and 64 for forward biasing each of their base-emitter junctions. All three transistors are therefore conductive whereby the red, green and blue video signals are coupled from conductors 20, 22 and 24 to nodes 74R, 74G and 74B and therefrom to inputs 30, 32 and 34 of video output circuit 36 for application to CRT 38. The CRT is therefore driven in response to the received color television signal for reproducing a corresponding color video image.

Next, assume that it is desired to display selected alpha-numeric characters in, for example, a red color. The digital signals defining the selected alpha-numeric characters are coupled to interface circuit 10 from either character generator 42 or 42a by closing switch 50, switches 52 and 54 being left open. Of course, and as explained previously, similar results can be obtained by appropriately wiring conductors between character generator 42 or 42a and interface circuit 10. In either event, the digital alpha-numeric signals are coupled by resistor 78R and diode 76R to circuit node 74R. At the same time, the blanking signal developed on conductor 56 or 56a is switched to ground potential for the portion of the sweep of CRT 38 during which it is desired to display the alpha-numeric information. As mentioned previously, the blanking signal may be developed during the entire sweep of the CRT or during a selected portion thereof. While the blanking signal is at ground potential, diodes 70R, 70G and 70B are forward biased each drawing current through blanking resistor 72 and reducing the positive potential at the emitters of transistors 60, 62 and 64 to a level of preferably about 3.0 volts for reverse biasing each of their base-emitters junctions, the amount of potential reduction being controlled by the resistance of blanking resistor 72 whose value is selected to produce a reduced potential at or below the blanking level of the CRT of the television receiver. Therefore, while the blanking signal is at ground potential, all three transistors are cutoff and a potential is developed at the emitters of transistors 60, 62 and 64, as well as at nodes 74R, 74G and 74B, at or below the blanking level of the receiver. At node 74R, however, the reduced blanking potential is increased above the blanking level in accordance with the digital alpha-numeric signals coupled to switch 50 enabling the display of corresponding alpha-numeric characters in a red color on screen 40 of CRT 38, the brightness or intensity of the display being controlled by the resistance of resistor 78R. This display will be superimposed over a blanked portion of the screen corresponding to the time during which the blanking signal is at ground potential, which may, of course, comprehend the entire raster or a selected portion thereof.

Alpha-numeric displays characterized by colors other than red may be produced in a similar manner. For example, green alpha-numeric characters would be produced by coupling the digital alpha-numeric signals through switch 52 to circuit node 74G and blue characters by coupling the signals to node 74B through switch 54. Also, the digital alpha-numeric signals can be coupled to two or more of the circuit nodes 74R, 74G and 74B for displaying the alpha-numeric characters in various combinations of the primary red, green and blue colors. Thus, for example, white alpha-numeric characters are displayed by coupling the digital alpha-numeric signals to each of the circuit nodes 74R, 74G and 74B.

What has thus been shown is an improved interface circuit for a color television receiver enabling the receiver to be operated for displaying a color video image in accordance with a received color television signal or for displaying, in a selected color, alpha-numeric characters supplied by a suitable character generator on all or a portion of the television screen from which the video signals have been blanked. The character generator may comprise the type developing digital alpha-numeric defining signals on a single output conductor or the type producing such signals on three separate output conductors. Also, the interface circuit enables the use of the television receiver 25 as a video monitor by substituting a suitable source of red, green and blue video signals for the character generator and by blanking the video signals produced by the receiver in response to the video detector output.

While a particular embodiment of the invention has been shown and described, it will be obvious to those skilled in the art that various changes and modifications may be made therein without departing from the invention in its broader aspects. The aim of the appended claims, therefore, is to cover all such changes and modifications as fall within the true spirit and scope of the invention.

What is claimed is:

1. In a color television receiver having means developing red, green and blue video signals at respective circuit terminals in response to a received television signal and output means adapted for processing said video signals for producing a corresponding video image on a color CRT, the improvement comprising:
    means operable for developing an information signal;
    means operable for developing a blanking signal;
    means responsive to said blanking signal for shunting each of said circuit terminals for maintaining the potential thereof at or below the blanking level of said CRT;
    means forming a circuit node between each of said circuit terminals and said output means, each of said circuit nodes being adapted for developing a potential above the blanking level of said CRT; and
    means operable for coupling said information signal to selected ones of said circuit nodes for developing a potential at said selected circuit nodes above the blanking level of said CRT, whereby an image is produced on the screen of said CRT corresponding to said information signal and in a color determined by said selected nodes.

2. The improvement according to claim 1 wherein said means for shunting comprises a plurality of diodes each connected to a respective one of said circuit terminals and responsive to said blanking signal for assuming a conductive state.

3. The improvement according to claim 1 wherein said circuit node forming means comprises a plurality of resistors each connected between a respective one of said circuit terminals and said output means.

4. The improvement according to claim 1 wherein said means for coupling comprises a plurality of diodes each adapted for coupling said information signal to a respective one of said circuit nodes.

5. The improvement according to claim 1 wherein said information signal developing means comprises character generator means operable for developing a digital information signal representing selected alpha-numeric or graphics type data.

6. The improvement according to claim 5 wherein said character generator means includes a single output conductor developing said digital information signal and wherein said means for coupling comprises means adapted for coupling said digital information signal from said single output conductor to each of said selected ones of said circuit nodes.

7. The improvement according to claim 5 wherein said character generator means includes three output conductors developing said digital information signal and wherein said means for coupling comprises means adapted for coupling each of said three output conductors to a respective one of said selected circuit nodes.

8. In a color television receiver having means developing red, green and blue video signals at respective circuit terminals in response to a received television signal and output means adapted for processing said video signals for producing a corresponding video image on a color CRT, the improvement comprising:
    means operable for developing an information signal;
    means operable in time coincidence with said information signal developing means for developing a blanking signal;
    a plurality of first diodes each connected to a respective one of said circuit terminals, each of said first diodes assuming a conductive state in response to said blanking signal for shunting each of said circuit terminals for maintaining the potential thereof at or below the blanking level of said CRT;

means forming a circuit node between each of said circuit terminals and said output means, each of said circuit nodes being resistively isolated from its associated circuit terminal; and means operable for coupling said information signal to selected ones of said circuit nodes for developing a potential at said selected circuit nodes above the blanking level of said CRT, whereby an image is produced on the screen of said CRT corresponding to said information signal and in a color determined by said selected nodes.

9. The improvement according to claim 8 wherein said information signal developing means comprises character generator means operable for developing a digital information signal representing selected alphanumeric or graphics type data.

10. The improvement according to claim 9 wherein said character generator means includes a single output conductor developing said digital information signal and wherein said means for coupling comprises means adapted for coupling said digital information signal from said single output conductor to each of said selected ones of said circuit nodes.

11. The improvement according to claim 9 wherein said character generator means includes three output conductors developing said digital information signal and wherein said means for coupling comprises means adapted for coupling each of said three output conductors to a respective one of said selected circuit nodes.

12. The improvement according to claim 8 wherein said means for coupling comprises a plurality of unidirectional conduction paths each connected between said information signal developing means and a respective one of said selected circuit nodes.

* * * * *